United States Patent
Steinmetz

(10) Patent No.: US 9,414,582 B2
(45) Date of Patent: Aug. 16, 2016

(54) BOX-TYPE TURKEY CALL PROVIDING MULTIPLE STRIKING POSITIONS

(71) Applicant: Eric Wayne Steinmetz, Nazareth, PA (US)

(72) Inventor: Eric Wayne Steinmetz, Nazareth, PA (US)

(*) Notice: Subject to any disclaimer, the term of this patent is extended or adjusted under 35 U.S.C. 154(b) by 0 days.

(21) Appl. No.: 14/694,940

(22) Filed: Apr. 23, 2015

(65) Prior Publication Data

US 2015/0335008 A1 Nov. 26, 2015

Related U.S. Application Data

(60) Provisional application No. 62/001,809, filed on May 22, 2014.

(51) Int. Cl.
*A01M 31/00* (2006.01)

(52) U.S. Cl.
CPC .................... *A01M 31/004* (2013.01)

(58) Field of Classification Search
CPC ....... A63H 5/00; A01M 31/00; A01M 31/004
See application file for complete search history.

(56) References Cited

U.S. PATENT DOCUMENTS

| | | | | |
|---|---|---|---|---|
| 4,422,262 A * | 12/1983 | Moss | ................. | A63H 5/00 446/397 |
| 5,484,319 A * | 1/1996 | Battey | ................. | A01M 31/004 446/397 |
| 5,846,119 A * | 12/1998 | Long | ................. | A01M 31/004 446/397 |
| 6,149,493 A * | 11/2000 | Long | ................. | A01M 31/004 446/397 |
| 7,980,915 B2 * | 7/2011 | Burcham | ................. | A01M 31/004 43/1 |
| 8,142,253 B2 * | 3/2012 | Peel | ................. | A01M 31/004 446/397 |
| 2007/0184752 A1 * | 8/2007 | Zearing | ................. | A01M 31/004 446/418 |
| 2011/0097970 A1 * | 4/2011 | Wyant | ................. | A01M 31/004 446/418 |

* cited by examiner

*Primary Examiner* — Gene Kim
*Assistant Examiner* — Alyssa Hylinski
(74) *Attorney, Agent, or Firm* — Dunlap Bennett & Ludwig PLLC

(57) ABSTRACT

A box-type game call having a striking portion that can be moved between a plurality of striking positions is provided. The game call may incorporate a plurality of sound rails, whereby the striking portion may be pivotally connected relative to the plurality of sound rails, along at least two axes of rotation, so as to be movable to operatively engage each sound rail separately from a variety of striking positions.

12 Claims, 4 Drawing Sheets

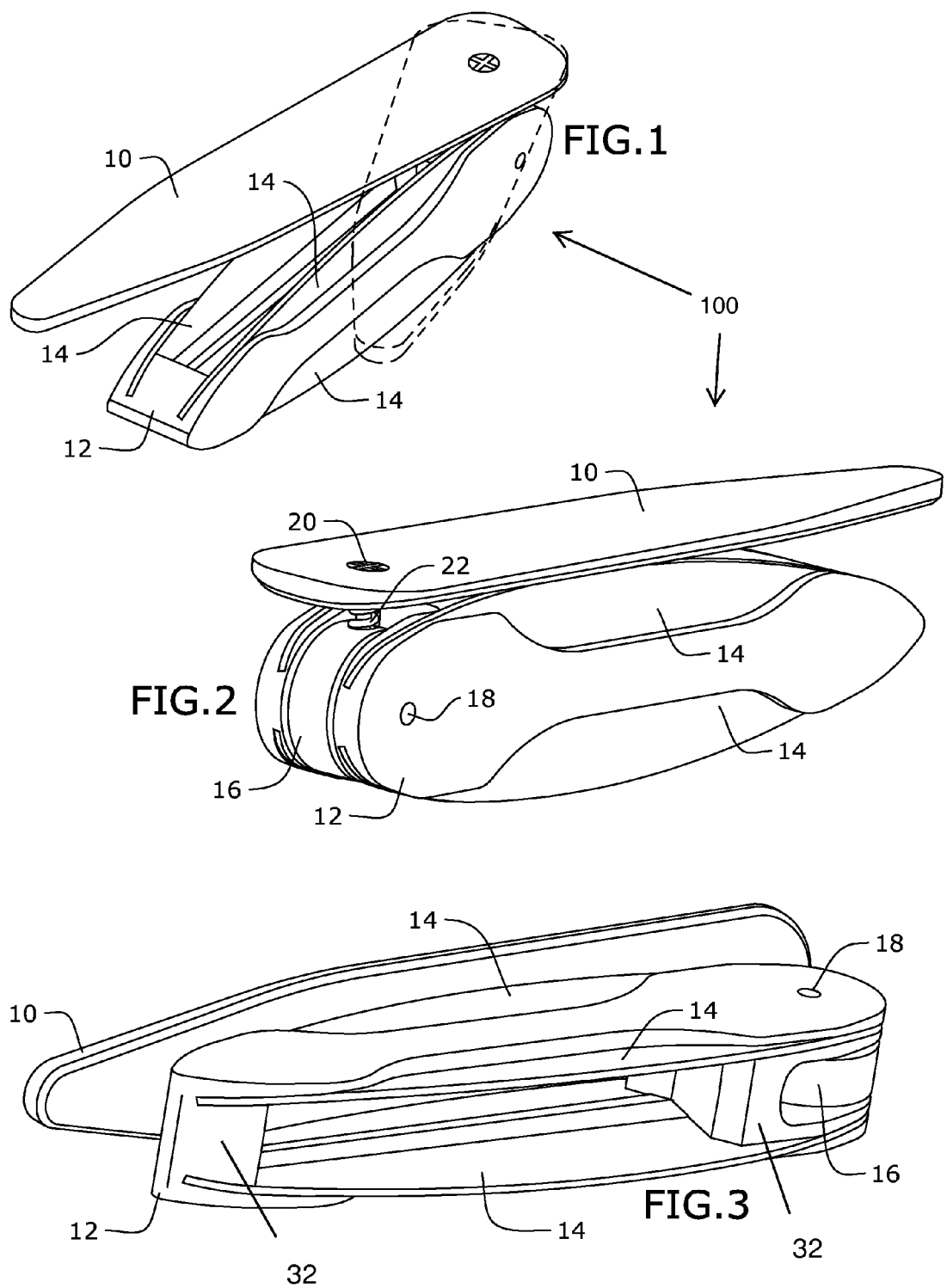

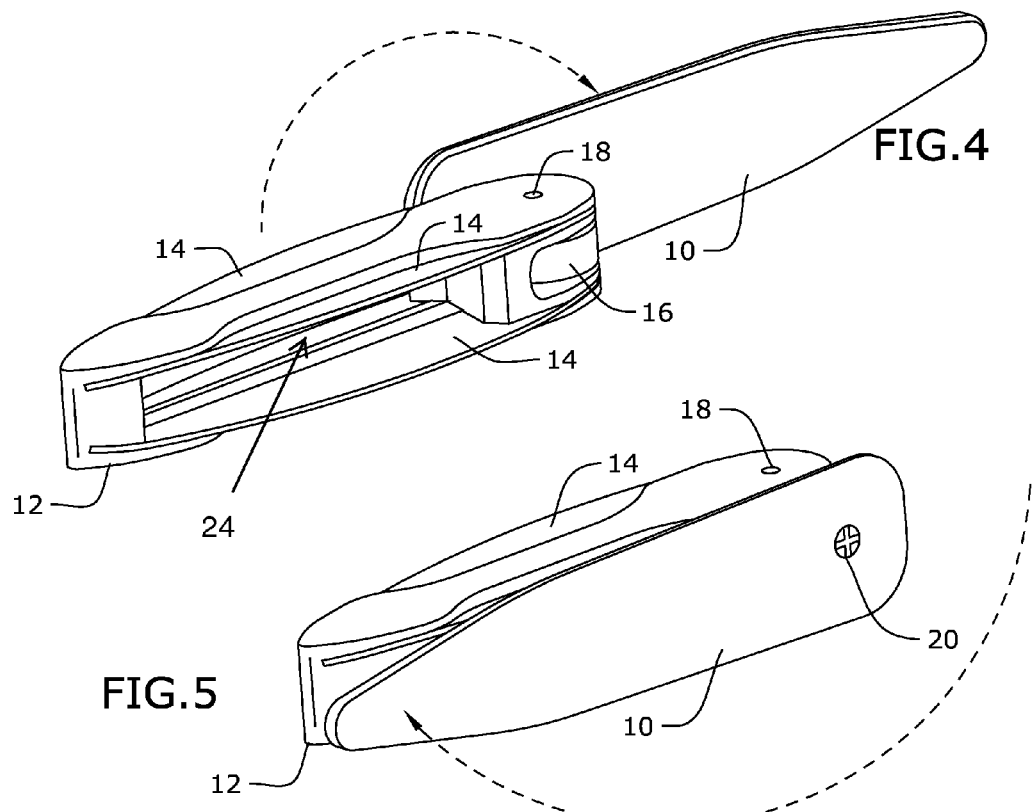
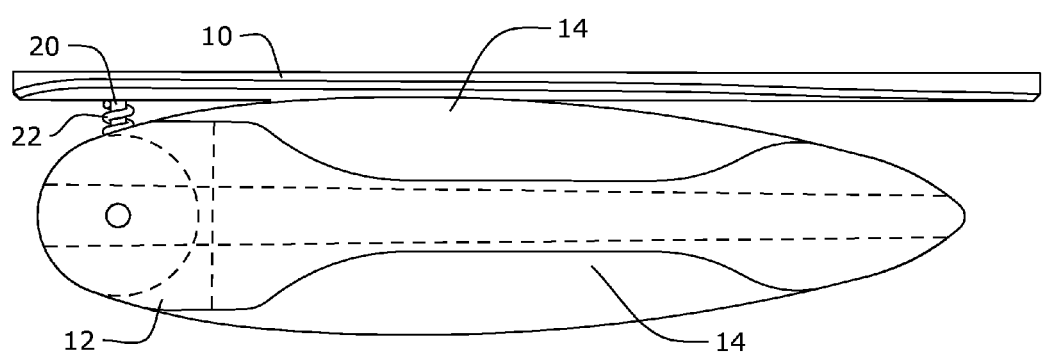

US 9,414,582 B2

BOX-TYPE TURKEY CALL PROVIDING MULTIPLE STRIKING POSITIONS

CROSS-REFERENCE TO RELATED APPLICATION

This application claims the benefit of priority of U.S. provisional application No. 62/001,809, filed 22 May 2014, the contents of which are herein incorporated by reference.

BACKGROUND OF THE INVENTION

The present invention relates to animal calls and, more particularly, to a box-type game call having a striking portion that can be moved between a plurality of striking positions.

Just like there are many ways to skin a cat, there are many ways to coax turkeys into shooting range. As a result, traditionally turkey hunters need to take multiple calls into the woods to call in game turkeys as current turkey call boxes only make one or two sounds.

As can be seen, there is a need for a box-type game call having a striking portion that can be moved between a plurality of striking positions so as to make various turkey calls using one device, thereby allowing the hunter to travel lighter into the hunting woods.

SUMMARY OF THE INVENTION

In one aspect of the present invention, a box-type turkey call having a striking portion movable between a plurality of striking positions includes two sidewall portions extending from a coupling end to a distal end, wherein the two sidewall portions are adapted to support a plurality of sound rails; a pivot coupling rotatably connected to the two sidewall portions near the coupling end; and a striking portion rotatably mounted to the pivot coupling about an axis of rotation generally perpendicular to an axis of rotation of the pivot coupling, whereby the striking portion is movable between a plurality of striking position, wherein each striking position is the operative engagement of at least one sound rail.

In another aspect of the present invention, a turkey call having a striking portion movable between a plurality of striking positions includes two sidewall portions extending from a coupling end to a distal end, wherein the two sidewall portions are joined near the distal end and near the coupling end by opposing body portions, and wherein the opposing body portions form a plurality of complementary rail slots; a pivot coupling interconnecting the two sidewall portions near the coupling end so that the pivot coupling rotates relative to the two sidewall portions, wherein the pivot coupling forms a post hole along its periphery; a striking portion forming a countersunk bore; a post having a head, wherein the post rotatably mounts the striking portion to the post hole about an axis of rotation generally perpendicular to an axis of rotation of the pivot coupling; a spring adapted to bias the striker portion to the head of the post snugly received in the countersunk bore; an open-ended coupling cavity defined by the two sidewall portions and the pivot coupling; and a plurality of interchangeable sound rails dimensioned and adapted to be removably secured in the plurality of rail slots, whereby the striking portion is movable between a plurality of striking position, wherein each striking position is the operative engagement of at least one sound rail.

These and other features, aspects and advantages of the present invention will become better understood with reference to the following drawings, description and claims.

BRIEF DESCRIPTION OF THE DRAWINGS

FIG. 1 is a top front perspective view of an exemplary embodiment of the present invention;

FIG. 2 is a top rear perspective view of an exemplary embodiment of the present invention;

FIG. 3 is a bottom perspective view of an exemplary embodiment of the present invention;

FIG. 4 is a bottom perspective view of an exemplary embodiment of the present invention, illustrating a striking portion moving between a plurality of striking positions relative to FIG. 3;

FIG. 5 is a bottom perspective view of an exemplary embodiment of the present invention, illustrating the striking portion moving between a plurality of striking positions relative to FIG. 4;

FIG. 6 is a side view of an exemplary embodiment of the present invention;

DETAILED DESCRIPTION OF THE INVENTION

Figure 7:
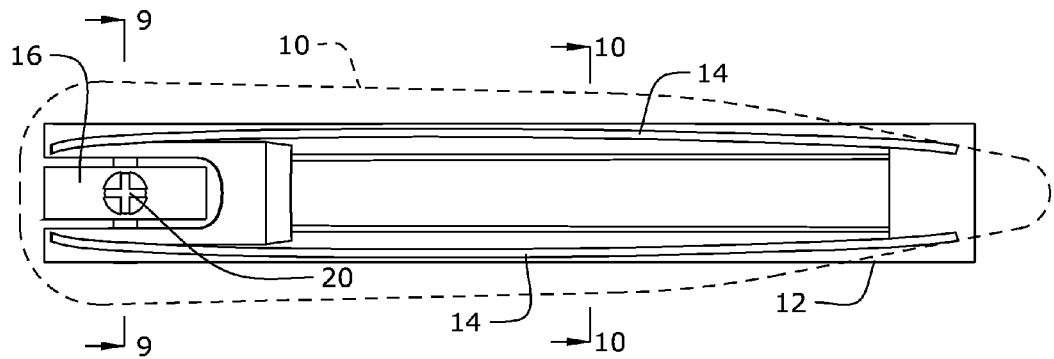
FIG. 7 is a top view of an exemplary embodiment of the present invention, with the striker portion removed for the sake of clarity.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a box-type game call having a striking portion that can be moved between a plurality of striking positions. The game call may incorporate a plurality of sound rails, whereby the striking portion may be pivotally connected relative to the plurality of sound rails, along at least two axes of rotation, so as to be movable to operatively engage each sound rail separately from a variety of striking positions.

Referring to FIGS. 1 through 11, the present invention may include a box-type turkey call 100 having a striking portion 10 that can be moved between a plurality of striking positions. The turkey call 100 may include multiple sets of sound rails 14, whereby the striking portion 10 may be pivotally connected thereto along at least two axes of rotation so as to be movable to operatively yet separately engage at least one sound rail 14. The use of different woods (species) for the sound rails 14 and the striking portion 10 may be varied so as to produce various pitch, frequencies and other tonal characteristics. The other components of the turkey call 100 may be made of different resilient materials, for example such as polyethylene, polypropylene, vinyl, nylon, rubber, various impregnated or laminated fibrous materials, various plasticized materials and the like.

The turkey call 100 may include a pair of complementary sidewall portions 12 whose inner sides define an open-sided coupling cavity 24. Each sidewall portion 12 may extend from a coupling end to a distal end. In certain embodiments, the two sidewall portions 12 may be joined near the distal end and/or near the coupling end by body portions 32. Colloquially, the sidewalls portions, open-sided cavity and/or the body portions form the box or box piece of the turkey call 100.

Figure 8:
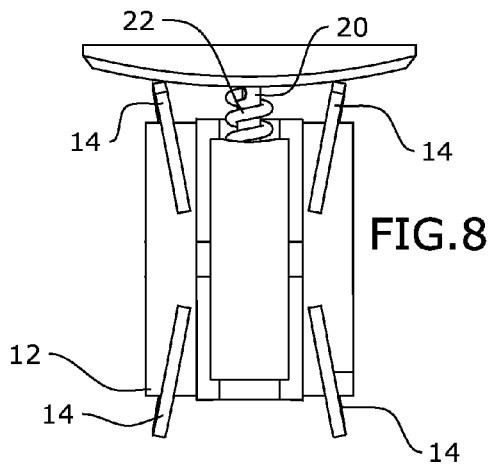
FIG. 8 is a rear view of an exemplary embodiment of the present invention.
Figure 9:
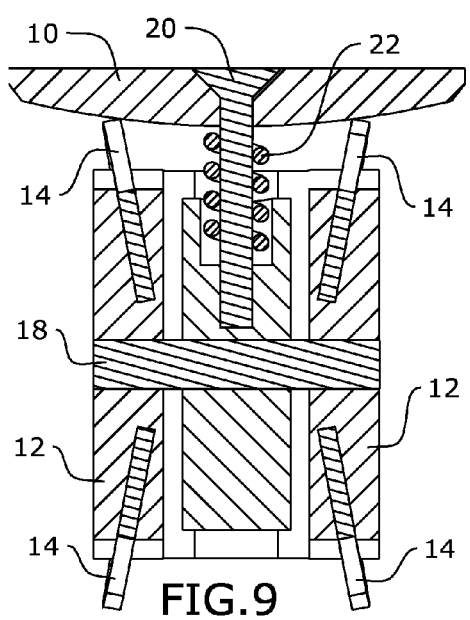
FIG. 9 is a section view of an exemplary embodiment of the present invention, taken along line 9-9 in FIG. 7.
Figure 10:
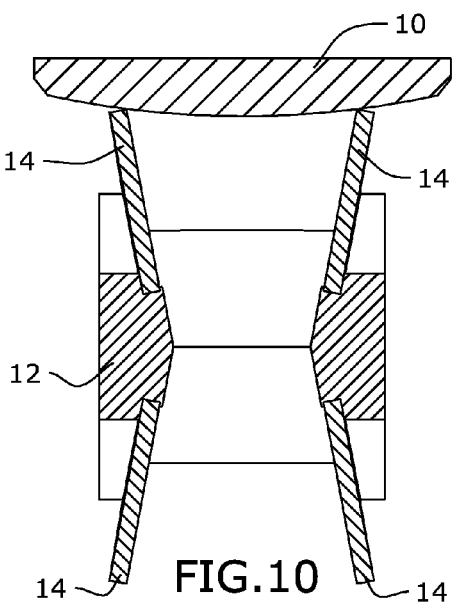
FIG. 10 is a section view of an exemplary embodiment of the present invention, taken along line 10-10 in FIG. 7.

Each body portion 32 may form a plurality of complementary rail slots 34 dimensioned and adapted to removably secure sound rails 14 extending from the coupling end to the distal end. Thereby, a plurality of sound rails 14 may be disposed on the same turkey call 100, as illustrated in FIGS. 8 through 10. The rail slots enable the plurality of sound rails 14 to be interchangeable when a users desires to make different sounding turkey calls. In certain embodiments, the two sidewall portions may be adapted to support the plurality of sound rails 14 without the aid of the body portions.

The sound rails 14 are dimensioned to protrude from the rail slots 34. The sound rails 14 may be adapted so that the striking portion 10 can operatively engage each from a striking position so as to vibrate them and produce sound that imitates the vocalizations of a turkey or other types of game calls. In certain embodiments, the angle of orientation of the rail slots 34 may be non-planar to the sidewall portions 12. The sound rails 14 may be dimensioned and adapted to provide various predetermined edge curvatures, various material types and the like to produce the various call-sound characteristics the user may choose from when interchanging them.

Figure 11:
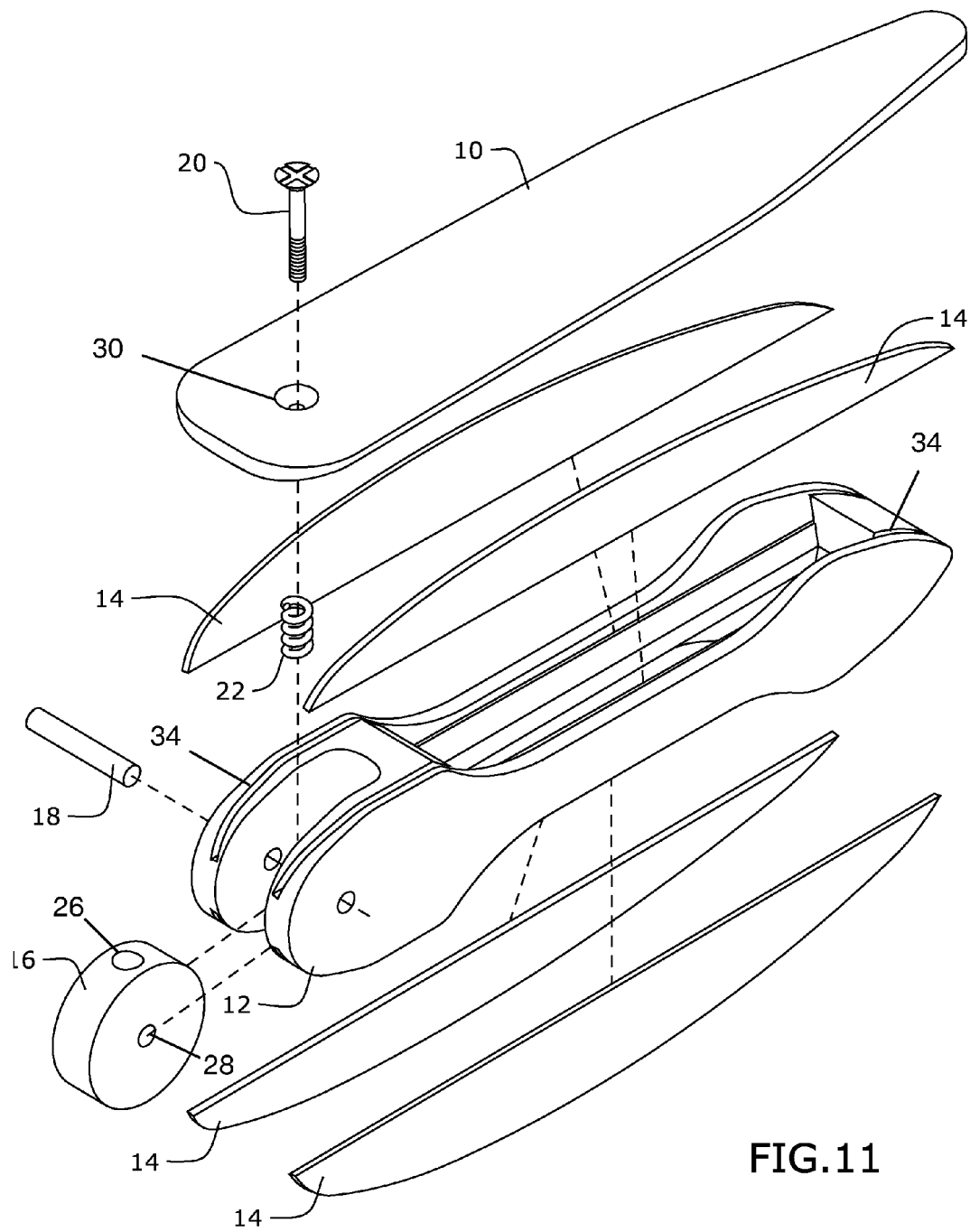
FIG. 11 is an exploded view of an exemplary embodiment of the present invention.

Near the coupling end the pair of sidewall portions 12 may be interconnecting by a pivot coupling 16. The pivot coupling 16 may be a wheel, a pivot pin, a disc or the like so as to rotate about an axis of rotation perpendicular to the pivot coupling 16. The pivot coupling 16 may be pivotally supported by a dowel 18 journaled through a first sidewall portion 12, the pivot coupling 16, and then the opposing sidewall portion 12. The pivot coupling 16 may form a dowel hole 28 for receiving the dowel 18. The pivot coupling 16 may form a post hole 26 along its periphery for pivotally connecting a post 20, as illustrated in FIG. 11.

The strike portion 10 may be pivotally connected to the pivot coupling 16 so as to be rotatable in a direction generally perpendicular to the axis of rotation of the pivot coupling 16. The striking portion 10 may form a countersunk bore 30 so that a post 20, such as a screw or some other fastener, may pivotally connect the strike portion 10 to the pivot coupling 16. The post 20 may have a head. A spring 22 may be disposed along the post 20 so as to resiliently bias the striking portion to the head of the post 20, wherein the head may be received in the countersunk bore 30.

A method of using the present invention may include the following. Providing the turkey call 100 disclosed above. A user, holding the sidewall sections is one hand, may by use the other hand to rotate the striking portion 10 about an axis of rotation parallel to the pivot coupling 16, as illustrated in FIG. 4, so as to rotate the striking portion 10 generally perpendicular relative to the preceding axis afforded by the pivot coupling 16, as illustrated in FIG. 5, whereby the striking portion 10 can be moved between at least one sound rail 14.

In certain embodiments, the user may operatively engage a plurality of sound rails 14 simultaneously, forming yet a new sounding turkey call.

It should be understood, of course, that the foregoing relates to exemplary embodiments of the invention and that modifications may be made without departing from the spirit and scope of the invention as set forth in the following claims.

What is claimed is:

1. A turkey call having a striking portion movable between a plurality of striking positions comprising:
    two sidewall portions, each having a first edge and an opposing second edge, said edges extending along a longitudinal axis from a coupling end to a distal end, wherein each of said edges are adapted to support a sound rail;
    a pivot coupling rotatably interconnected between the two sidewall portions so that an associated first axis of rotation is disposed through the two sidewall portions; and
    a striking portion pivotally mounted to a periphery of the pivot coupling for rotating the striking portion about a second axis of rotation transverse to the first axis of rotation,
    wherein the pivot coupling is rotatable about the first axis of rotation approximately 180 degrees so that the striking portion is movable between a first striking position adjacent said first edges and a second striking position adjacent said second edges.

2. The turkey call of claim 1, wherein the two sidewall portions and the pivot coupling define an open-sided coupling cavity.

3. The turkey call of claim 2, wherein a first body portion joins the two sidewall portions near the coupling end; and a second body portion joins the two sidewall portions near the distal end, further defining the open-sided coupling cavity.

4. The turkey call of claim 1, further comprising a rail slot provided along each first and second edge for supporting the associated sound rail.

5. The turkey call of claim 4, wherein each sound rail is removably secured in and protruding from the associated rail slot so that each sound rail extends from the coupling end.

6. The turkey call of claim 1, wherein the pivot coupling includes a post hole along its periphery.

7. The turkey call of claim 6, further comprising a post that interconnects the striking portion to the post hole.

8. The turkey call of claim 7, further comprising a spring adapted to bias the striking portion to the post.

9. The turkey call of claim 8, wherein the striking portion includes a countersunk bore; and where the post terminates at a head dimensioned and adapted to snugly be received in the countersunk bore.

10. The turkey call of claim 1, further comprising a dowel journaled through the pivot coupling and two sidewall portions, defining the associated first axis of rotation.

11. The turkey call of claim 10, wherein the associated first axis of rotation is disposed inwardly from the peripheries of each of the two sidewall portions.

12. The turkey call of claim 1, wherein rotating the striking portion about the second axis of rotation along at least one sound rail forms a turkey call sound.

\* \* \* \* \*